United States Patent
Hu (10) Patent No.: US 7,356,166 B2
(45) Date of Patent: Apr. 8, 2008

(54) METHOD AND COMPUTER-READABLE MEDIUM FOR DETECTING MOTION AND FILTERING NOISE

(75) Inventor: Jessie Hu, Hsinchu (TW)

(73) Assignee: Goldbond LLC, Cheyenne, WY (US)

( * ) Notice: Subject to any disclaimer, the term of this patent is extended or adjusted under 35 U.S.C. 154(b) by 734 days.

(21) Appl. No.: 10/691,496

(22) Filed: Oct. 24, 2003

(65) Prior Publication Data
US 2005/0089195 A1    Apr. 28, 2005

(51) Int. Cl.
*G06B 9/00* (2006.01)
*H04N 7/18* (2006.01)

(52) U.S. Cl. .................. 382/107; 348/154; 348/155

(58) Field of Classification Search ............... 382/107; 348/154, 155; 73/488; 356/27
See application file for complete search history.

(56) References Cited

U.S. PATENT DOCUMENTS

| | | | |
|---|---|---|---|
| 6,393,153 B2 * | 5/2002 | Ozaki | 382/233 |
| 6,462,773 B1 * | 10/2002 | Koga | 348/143 |
| 7,075,683 B1 * | 7/2006 | Shiiyama | 358/452 |
| 2002/0154791 A1 * | 10/2002 | Onuma et al. | 382/103 |
| 2003/0185446 A1 * | 10/2003 | Huang et al. | 382/218 |
| 2004/0047419 A1 * | 3/2004 | Wakabayashi et al. | 375/240.16 |
| 2004/0233197 A1 * | 11/2004 | Liu et al. | 345/442 |

\* cited by examiner

*Primary Examiner*—Matthew C. Bella
*Assistant Examiner*—Randolph Chu
(74) *Attorney, Agent, or Firm*—Rosenberg, Klein & Lee (57) ABSTRACT

This invention provides a method and computer-readable medium for detecting motion and filtering noise from images. The method includes (a) dividing an incoming image into several blocks; (b) comparing the blocks to the corresponding blocks of a referred image and saving compared results into a declared data structure; (c) marking the compared result that exceeds the first predetermined threshold; (d) grouping the compared result into an adjacent region thereof; and (e) calculating a deviation value of the region and comparing the deviation value to the second predetermined threshold, whereby the motion in images can be detected and the noise caused from moire and the interference resulted from an area brightness variation also can be filtered out. In addition, the amount of operations in comparing images can be reduced as well due to the employment of block processing instead of pixel processing.

16 Claims, 7 Drawing Sheets

METHOD AND COMPUTER-READABLE MEDIUM FOR DETECTING MOTION AND FILTERING NOISE

BACKGROUND OF THE INVENTION

1. Field of the Invention

This invention generally relates to the field of image processing. More particularly, the present invention relates to a method and computer-readable medium for detecting motion and filtering noise from images and reducing the amount of operations in comparing images by employing block processing.

2. Description of the Prior Art

Motion detection has been introduced by various papers, literature, and patent specifications, and so on. The majority of motion detection techniques work on the principle of comparing an incoming image to a stored reference image. One common method is to subtract the value of each pixel of an incoming image from the corresponding pixel in the reference image, accumulate the resulting difference, and generate a motion indication while the accumulated difference value exceeds some predetermined thresholds. However, a problem with this approach is that values in the differences between all pixels contained in the incoming image and all pixels contained in the reference image are calculated. The sum of values in the differences needs to be calculated for each pixel, hence the amount of calculation is exorbitant and a powerful floating-point unit (FPU) and high-speed computational speeds are necessary.

Besides, noise sometimes can cause a wrong motion indication. For example, an area brightness variation or the moire caused from a camera sensor between the incoming image and the reference image makes the sum of values in the differences abruptly exceed the predetermined threshold, but actually no motion has occurred. Hence, this kind of noise needs to be filtered out in order to improve the precision of motion detection.

In view of the drawbacks mentioned with the prior art in motion detection, there is a continued need to develop a new and improved motion detection method that overcomes the disadvantages associated with motion detection in the prior art. The advantages of this invention are that it solves the problems mentioned above.

SUMMARY OF THE INVENTION

In accordance with the present invention, a method and computer-readable medium for detecting motion and filtering noise from images and reducing the amount of operations in comparing images by employing block processing substantially obviates one or more of the problems resulted from the limitations and disadvantages of the prior art mentioned in the background.

Accordingly, one object of the present invention is to provide a method for detecting motion by employing block processing.

Another object of the present invention is to provide a method for filtering noise from images such as the moire caused from a camera sensor and the interference resulted from an area brightness variation.

Yet another object of the present invention is to provide a method for reducing the amount of operations in comparing images in order to speed up image processing.

Still another object of the present invention is to provide a computer-readable medium encoded with computer program code for detecting motion and filtering noise from images.

According to the aforementioned objects, the present invention provides a method for detecting motion and filtering noise from images and reducing the amount of operations in comparing images by employing block processing. The method includes (a) dividing an incoming image into several blocks, wherein the size of each block is preferably 1%~4% of the incoming image; (b) comparing the blocks to corresponding blocks of a referred image and saving compared results into a declared data structure, wherein the referred image is a prior or a later image to the incoming image and the declared data structure includes an array, linking lists or a pointer structure, etc.; (c) marking a compared result that exceeds the first predetermined threshold, wherein the first predetermined threshold is preferably 1 and whereby a changed block corresponding to the compared result can be indicated; (d) grouping the compared result into an adjacent region thereof, wherein a double linked list is utilized to group the compared result and whereby changed blocks can be regionally grouped together; and (e) calculating the deviation value of the region and comparing the deviation value to the second predetermined threshold, wherein the second predetermined threshold is preferably 0.35 and whereby the motion in images can be detected and the noise caused from moire and the interference resulted from an area brightness variation also can be filtered out. In addition, the amount of operations in comparing images can be reduced as well, due to the employment of block processing instead of pixel processing.

Further, the aforementioned step (b) includes the comparing step as follow:

$$(\sqrt{(\Sigma(a_i-b_i)^2)})/(m*m),$$

where i=0 to m*m, m represents the pixel amount of one side for each divided block, and $a_i$ and $b_i$ respectively represent a pixel value of a corresponding block of the incoming image and the referred image.

Moreover, the aforementioned step (e) includes the calculating step as follow:

$$(\Sigma|x_i-x_{avg}|)/n*x_{avg},$$

where i=0 to n, n represents a quantity of the compared result that exceeds the first predetermined threshold in a region, $x_i$ represents the compared result, and $x_{avg}$ represents an average of the compared result in the region.

The present invention further discloses a computer-readable medium encoded with computer program code for detecting motion and filtering noise from images and reducing the amount of operations in comparing images by employing block processing. The program code causes a computer to execute a method including the aforementioned steps (a), (b), (c), (d) and (e), and further, the comparing step in the step (b) and the calculating step in the step (e) are also included. By doing so, the program code encoded within the computer-readable medium causes the computer to execute the method for detecting motion and filtering noise from images.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

Figure 1:
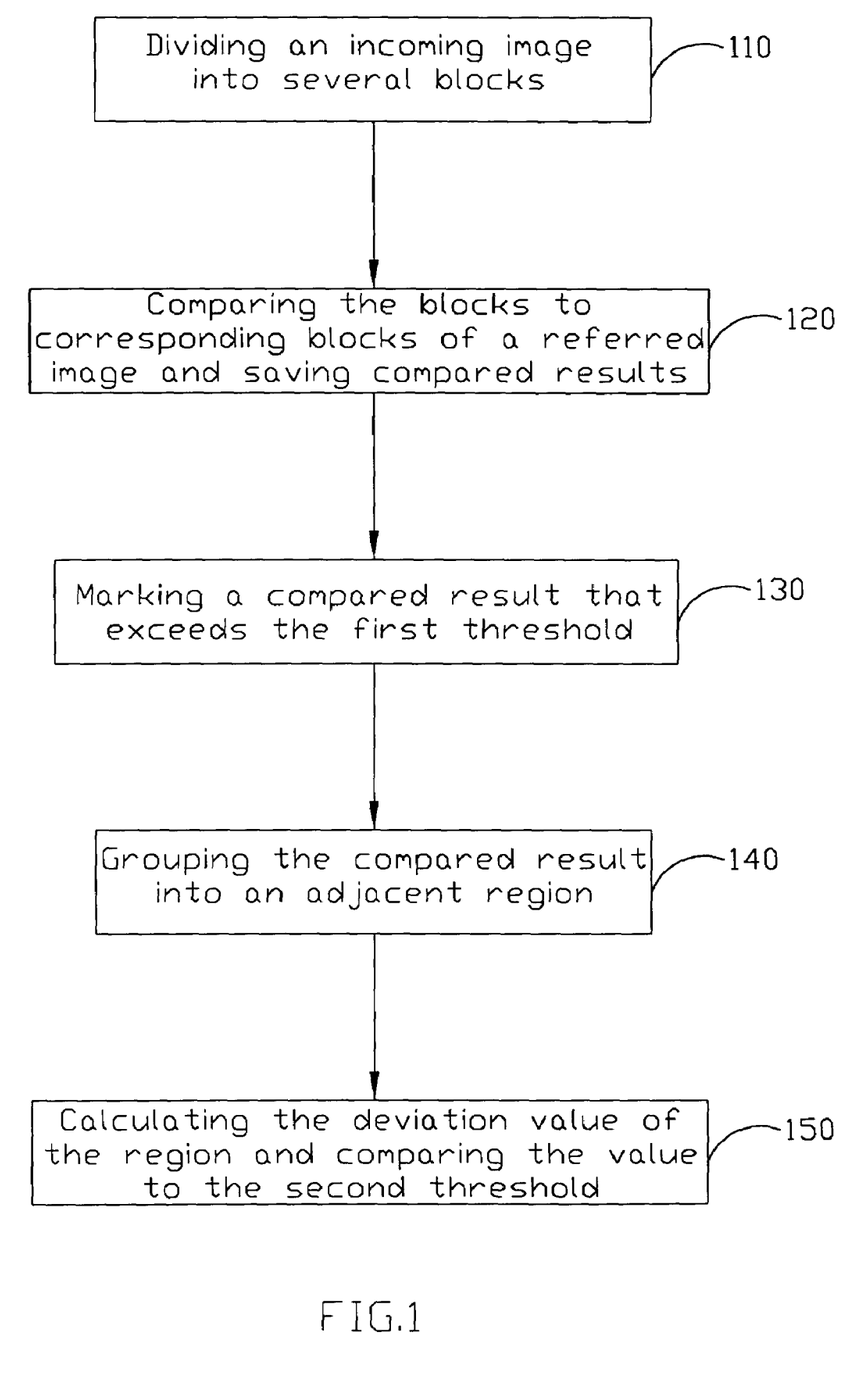
FIG. 1 illustrates a schematic flowchart for detecting motion and filtering noise from images in accordance with the present invention.

As shown in FIG. 1, a schematic flowchart for detecting motion and filtering noise from images and reducing the amount of operations in comparing images by employing block processing is illustrated. In step 110, as well as a referred image, an incoming image is divided into several blocks. The incoming image, of the same size and resolution as the referred image, can be precedent to or follow the referred one, and hence the incoming image and referred image can correspond and be compared with each other. Generally, the pixels of the incoming image, as well as the referred image, are decoded by a suitable method, such as a discrete cosine transform based (DCT-based) decoding process, to get their corresponding grayscale values, in the meantime, the images are also scaled down to ⅛. In the present invention, the preferable size of each block is about 1% to 4% of the incoming image, that is, the incoming image is firstly processed by a DCT-based process extracting DC values only (in the meanwhile, the image is scaled down to ⅛), and then the size of each block depends on the original resolution of the incoming image. For example, m=8 while the resolution is 640×480; m=6 while the resolution is 352×288; m=5 while the resolution is 320×244; and m=4 while the resolution is 176×144 (wherein, m represents the pixel amount of one side for each block). Therefore, the size of each block respectively is 8×8, 6×6, 5×5, and 4×4 pixels while the original resolution of the incoming image is 640×480, 352×288, 320×240, and 176×144 pixels. In step 120, the blocks are compared to the corresponding blocks of a referred image and the compared results are saved into a declared data structure. The referred image can be a prior or a later image to the incoming image and each of the compared results means the changed level of a corresponding block. The declared data structure can include an array, linking lists or a pointer structure, etc. In step 130, a compared result that exceeds the first predetermined threshold is marked for further processing. Wherein, the first predetermined threshold is preferably 1 and can be adjusted to meet the practical needs. After this step, a changed block corresponding to the compared result can be indicated. In step 140, the compared result is grouped into an adjacent region. Wherein, a data structure such as a double linked list is utilized to group the compared result. This step leads changed blocks to be regionally grouped together. In step 150, the deviation value of the region is calculated and compared to the second predetermined threshold. Wherein, the second predetermined threshold is preferably 0.35 and can be adjusted to meet the practical needs.

After the process, the motion in images can be detected and the noise caused from moire and the interference resulted from an area brightness variation also can be filtered out. In addition, the amount of operations in comparing images can be reduced as well due to the employment of block processing instead of pixel processing. This characteristic, especially, makes the process meet the requirement of an embedded system without a floating-point unit (FPU).

Further, the aforementioned step 120 includes the comparing step as follow:

$$(\sqrt{(\Sigma(a_i-b_i)^2)})/(m*m),$$

where i=0 to m*m, m represents the pixel amount of one side for each divided block, and $a_i$ and $b_i$ respectively represent a pixel value of a corresponding block of the incoming image and the referred image. This step produces a value representing the average changed level of a block. In the present invention, the value of "m" can be predetermined depending on the resolution of the incoming image. In an embodiment, "m" is 8 for the incoming image with the resolution of 640*480.

Moreover, the step 150 mentioned above includes the calculating step as follow:

$$(\Sigma|x_i-x_{avg}|)/(n*x_{avg}),$$

where i=0 to n, n represents a quantity of the compared result that exceeds the first predetermined threshold in a region, $x_i$ represents the compared result, and $x_{avg}$ represents an average of the compared result in the region. This step produces a value representing the average changed level of a region.

Figure 2:
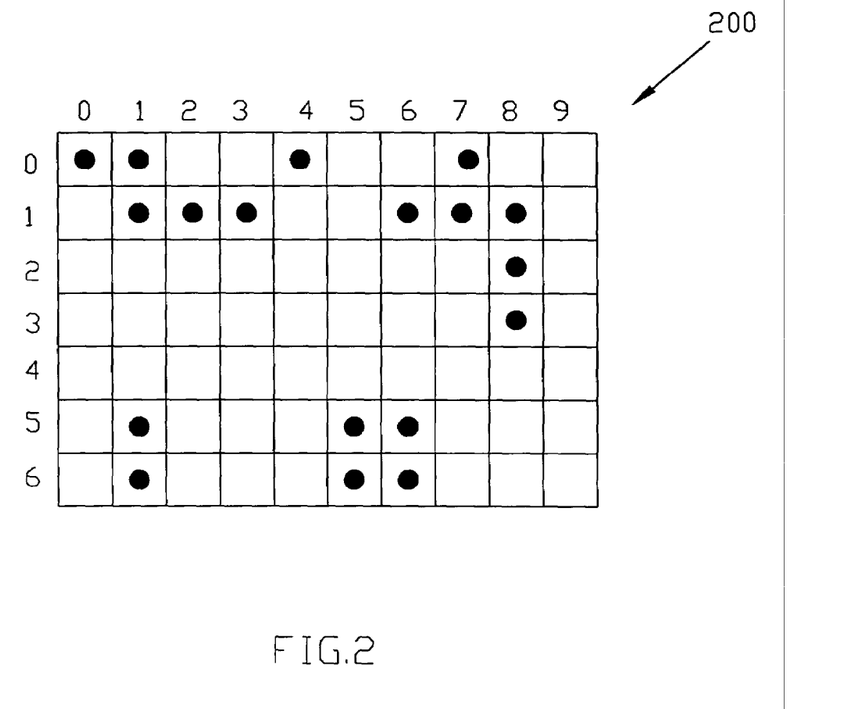
FIG. 2 illustrates an array structure having marked positions that save compared results exceeding the first predetermined threshold in accordance with one embodiment of the present invention.

As shown in FIG. 2, an array structure 200 having marked positions that save compared results exceeding the first predetermined in accordance with one embodiment of the present invention is illustrated. The embodiment takes an image resolution of 640*480 as an example, and hence the size of the array structure for saving compared results is 10*7 units after images are processed by a DCT-based process (⅛ scale by using the DC-value only) and a block-dividing process (m=8). Moreover, the black dots marked in the array structure 200 illustrate the values saved, such as 1, different from others without dots, such as 0. The value 1s represent those in the compared results exceeding the first predetermined threshold such as the positions (0,0), (0,1), (0,4), (0,7), (1,1), (1,2), etc., and further indicate corresponding blocks are changed. However, various marking methods and data structures can achieve this goal via different combinations, and hence the present invention just provides one possible combination for clear descriptions.

Figure 3:
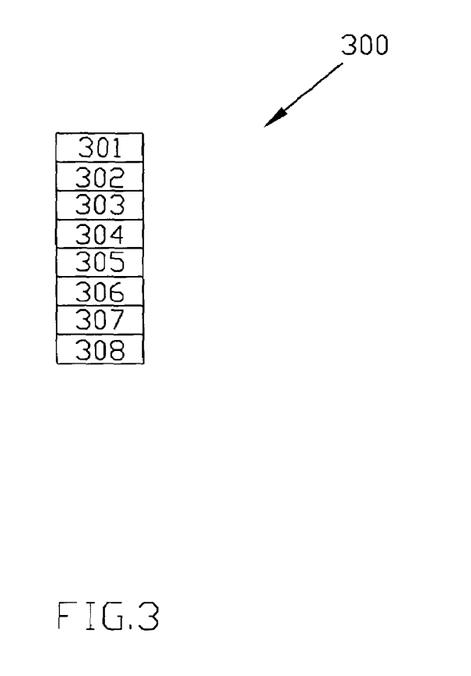
FIG. 3 illustrates a double liked list structure in accordance with one embodiment of the present invention.

As shown in FIG. 3, a double linked list 300 in accordance with the embodiment for grouping compared results into a region is illustrated. The double linked list 300 includes eight fields. The field 301 is utilized as a flag to indicate the relationship between this region and blocks in next row, such as "1" represents no adjacent relation and "0" represents an existence of adjacent relation. The field 302 indicates the amount of blocks in the region. The field 303 records the position of the bottom left block of the region. The field 304 indicates if the region is an independent region. The field 305 is an array pointer for pointing to the array saving the positions of the blocks in the region. The field 306 saves the deviation value of the region. The fields 307 and 308 are pointers and respectively link to a previous and a next double linked list. However, it should be understood that the fields are not just limited in this order.

Figure 4A:
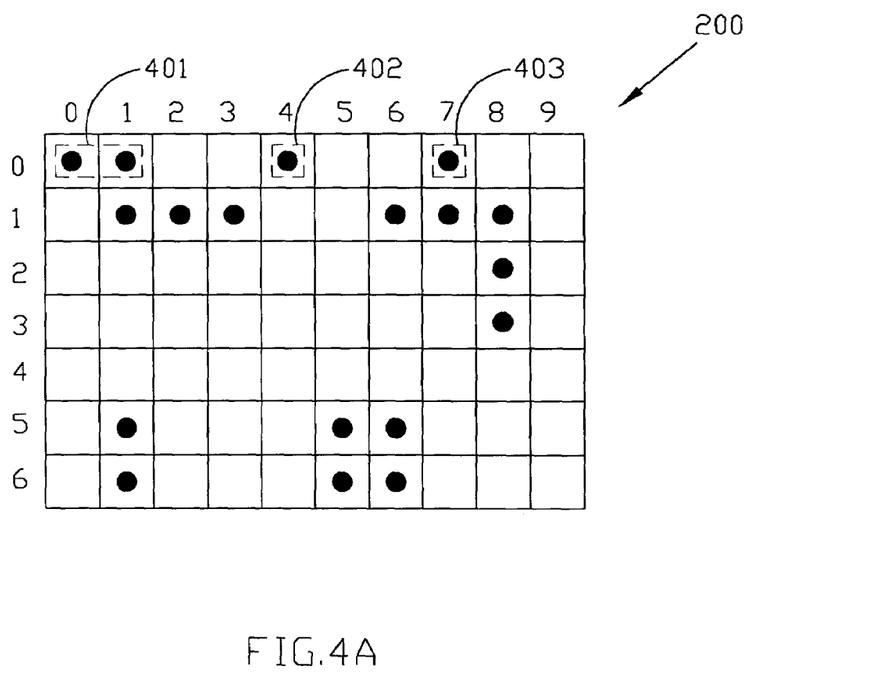
FIGS. 4A, 4C, 4E, 4G, and 4I illustrate the array structure of grouping processes of FIG. 2 in accordance with one embodiment of the present invention.
Figure 4B:
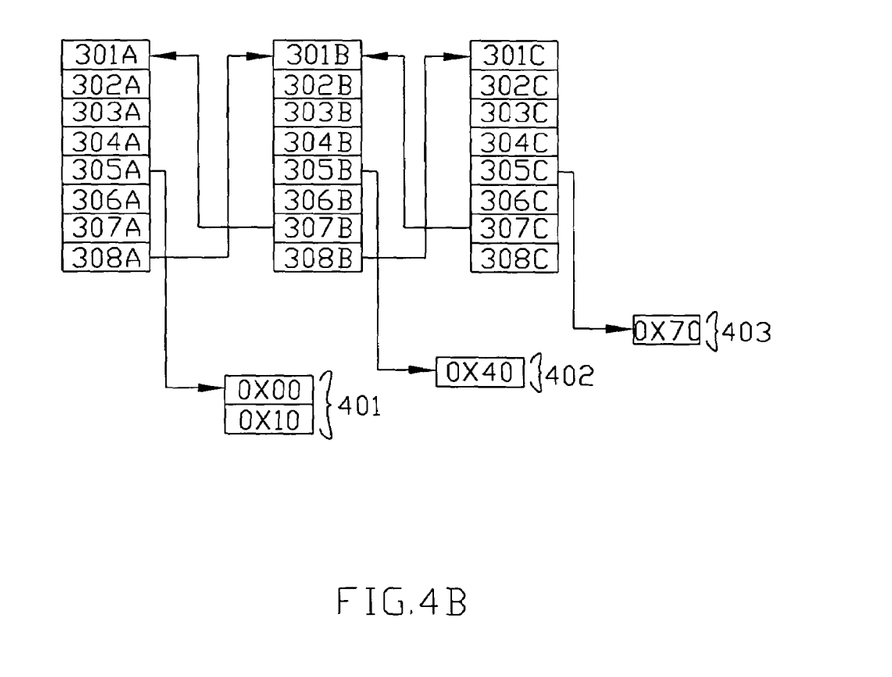
FIGS. 4B, 4D, 4F, 4H, and 4J illustrate the double linked lists of grouping processes of FIG. 2 in accordance with one embodiment of the present invention.

As shown in FIGS. 4A and 4B, the compared results exceeding the first predetermined threshold and saved in the first row are divided into three regions. As shown in FIG. 4A, the positions (0,0) and (0,1) are grouped together as a first region 401 and the position (0,4) and the position (0,7) are respectively grouped into a second region 402 and a third region 403. As shown in FIG. 4B, three double linked lists are used in representing three regions. The fields 301A, 301B, and 301C all save "0" since the regions 401, 402, and 403 are not independent on next block row yet. The field 302A saves "2" since there are two block positions in region 401, and the fields 302B and 302C respectively save "1" since region 402 and region 403 respectively include one block position. The fields 303A, 303B, and 303C respectively save the positions of the bottom left block of regions 401, 402, and 403. The fields 304A, 304B, and 304C all save "0" representing the regions 401, 402, and 403 are not independent yet. The fields 305A, 305B, and 305C respectively save the pointer linking to the array saving the block positions for regions 401, 402, and 403. The fields 306A, 306B, and 306C all save "0" since the deviation value are not calculated yet. The field 307A is "null" and the field 308A links to the next list. Similarly, the fields 307B and 308B respectively link to the previous and the next list, and the field 307C links to the previous list and the field 308C is "null".

Figure 4C:
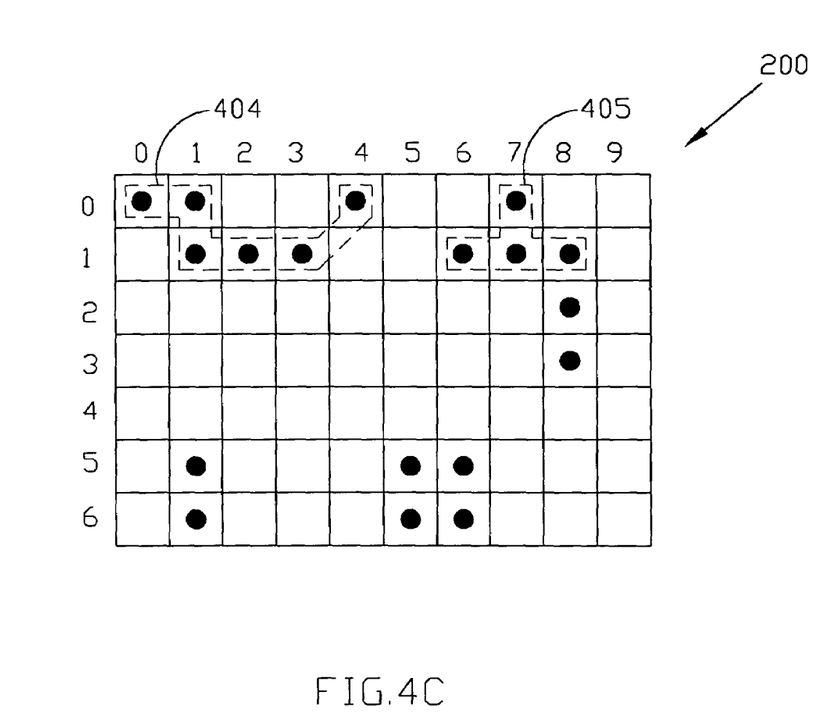
Figure 4D:
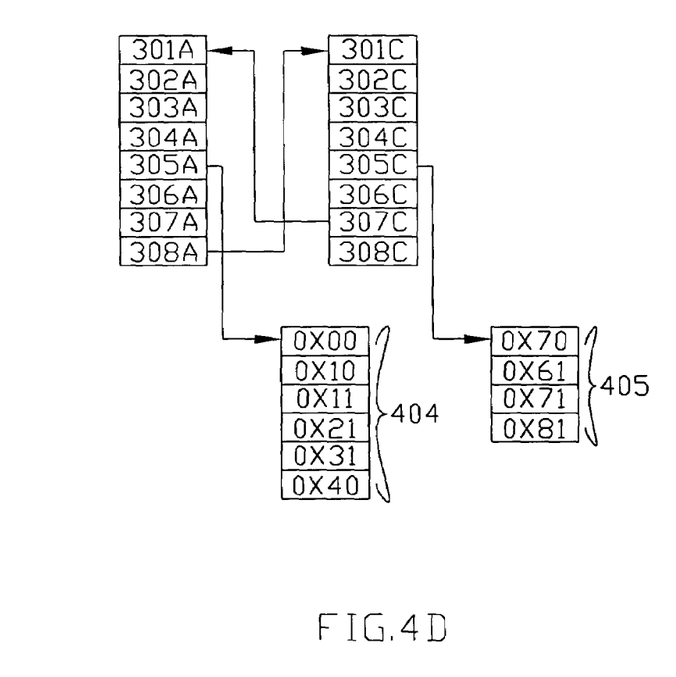

As shown in FIGS. 4C and 4D, the compared results saved in the first two rows are grouped into two regions. As shown in FIG. 4C, the first region 401 groups the positions (1,1), (1,2), (1,3), and the second region 402 together as a fourth region 404 and the third region 403 groups the positions (1,6), (1,7), and (1,8) together as a fifth region 405. As shown in FIG. 4D, three double linked lists are combined into two lists according to their adjacent relationship. Hence, the fields 301A and 301C save "0" representing regions 404 and 405 still are not independent on next block row. The field 302A saves "6" since region 404 has six blocks positions, and the field 302C save "4" since region 405 has four block positions. The fields 303A and 303C respectively save the positions of the new bottom left block of regions 404 and 405. The fields 304A and 304C still save "0" representing the regions 404 and 405 are not independent yet. The fields 305A and 305C respectively save the pointer linking to the array saving the block positions for regions 404 and 405. The fields 306A and 306C save "0" since the deviation value are not calculated yet. The field 307A is "null" and the field 308A links to the next list. Similarly, the field 307C links to the previous list and the field 308C is "null".

Figure 4E:
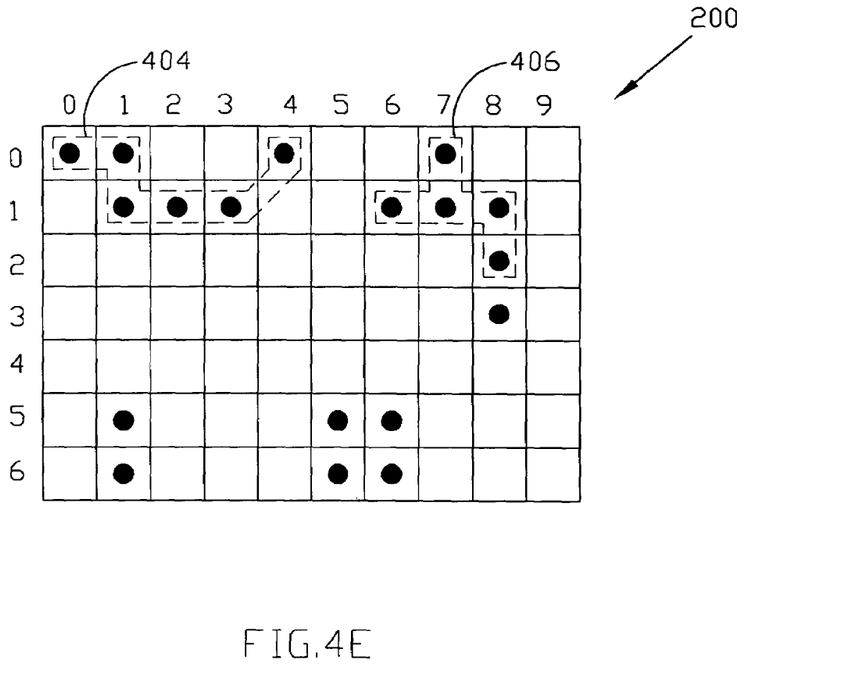
Figure 4F:
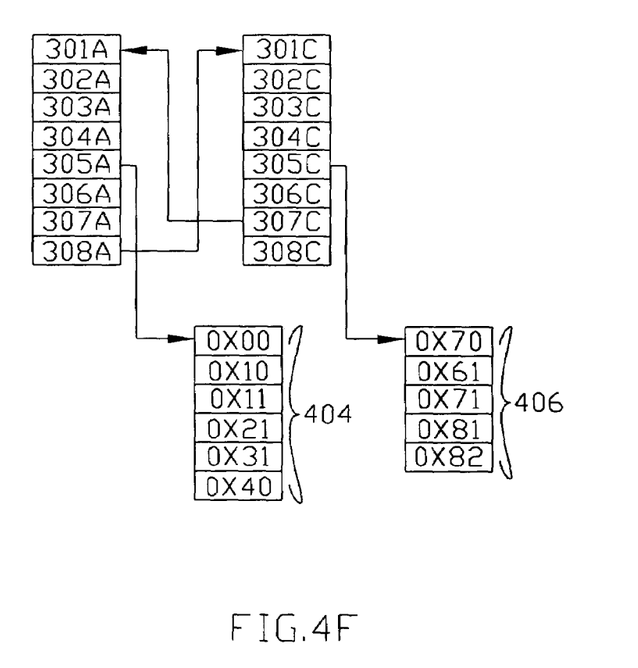

As shown in FIGS. 4E and 4F, the compared results saved in the first three rows are grouped into two regions. As shown in FIG. 4E, there is no change in the fourth region 404 since there is no block adjoining it and the region 405 groups the position (2,8) together as a sixth region 406. As shown in FIG. 4F, the field 301A changes the flag value to "1" and the fields 302A to 308A retain the same status as the previous step. This means region 404 is now independent on the next block row. Moreover, the change in field 302C is from "4" to "5", and field 303C saves the position of the new bottom left block of region 406 and the position (2,8) is grouped into region 406.

Figure 4G:
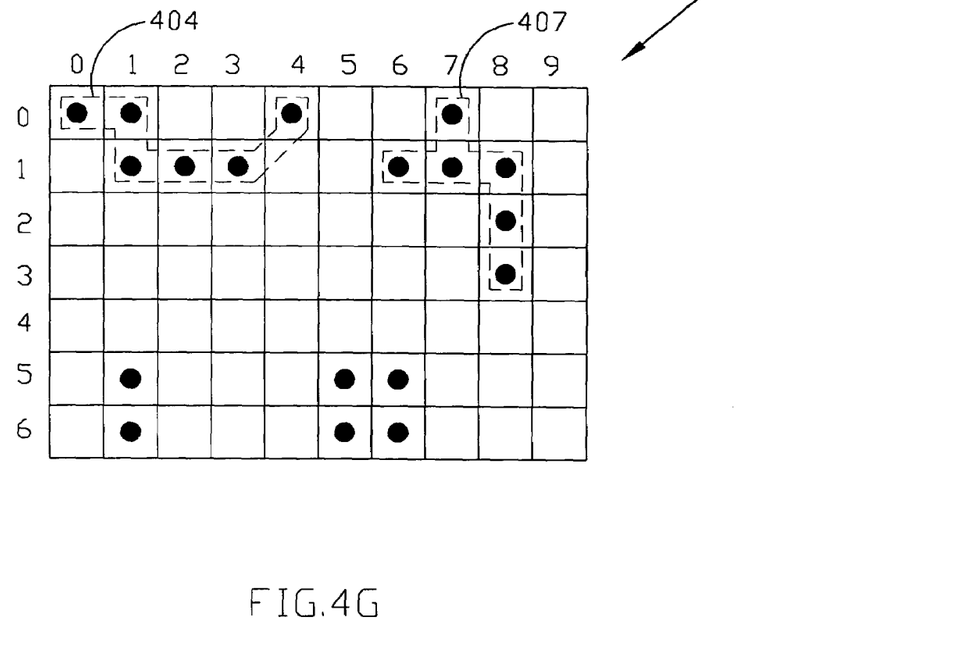
Figure 4H:
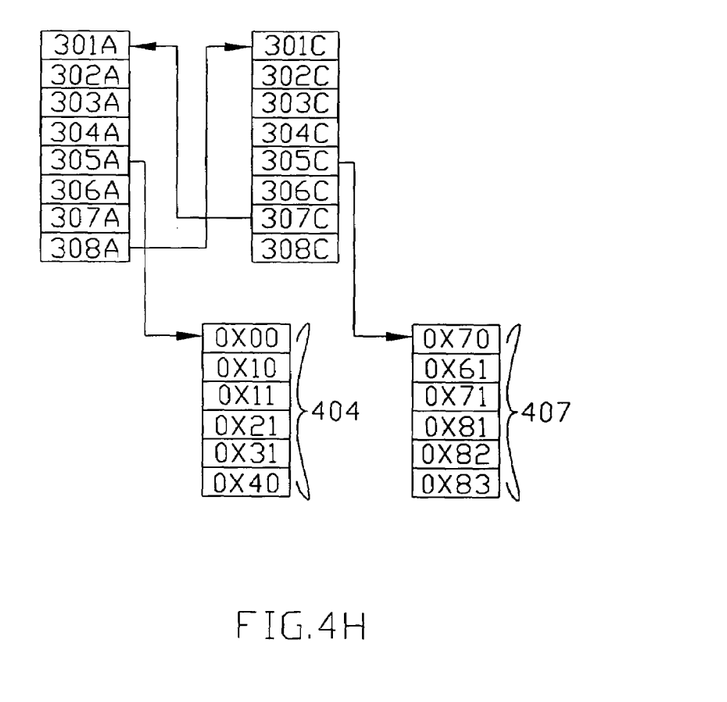

As shown in FIGS. 4G and 4H, the compared results saved in the first four rows are grouped into two regions. As shown in FIG. 4G, the fourth region 404 still retains the same status and the region 406 groups the position (3,8) together as a seventh region 407. As shown in FIG. 4H, the fields 301A to 308A retain the same status as the previous step. This means region 404 has no change in this process step. However, the change in field 302C is from "5" to "6", and field 303C saves the position of the new bottom left block of region 407 and the position (3,8) is grouped into region 407, simultaneously.

Referring to FIGS. 4G and 4H again, the compared results saved in the first five rows are grouped into two regions. As shown in FIG. 4G, the fourth region 404 and the seventh region 407 all retain the same status as the previous step. However, field 301C changes the flag value from "0" to "1". This means region 407 is now independent on the next block row. During the grouping processes, the deviation values of the independent regions are calculated. For example, the deviation values of the fourth region 404 and the seventh region 407 are respectively calculated before processing the sixth row.

Figure 4I:
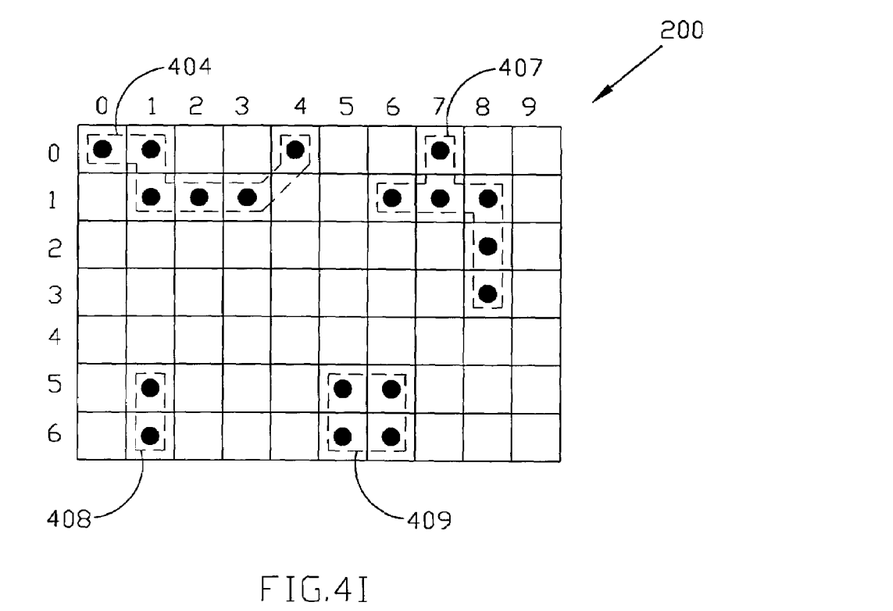
Figure 4J:
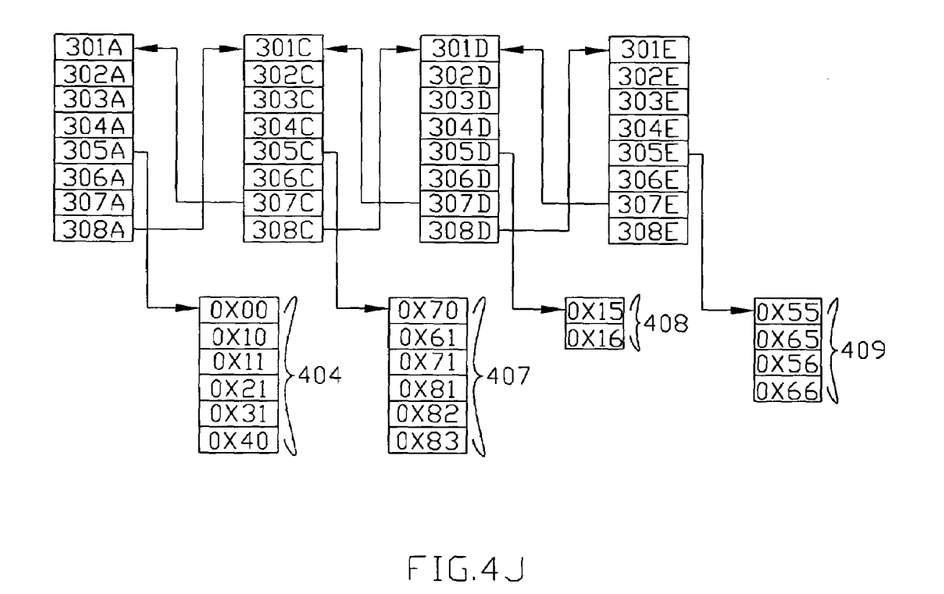

Similarly, the processes of the last two rows are similar to the processes described above, and hence the final results of the grouping process in accordance with the embodiment are respectively shown in FIGS. 4I and 4J. After the grouping procedure, the deviation values are utilized to compare to the second predetermined threshold for motion detection and noise filtering.

As mentioned earlier, the present invention further discloses a computer-readable medium encoded with computer program code for detecting motion and filtering noise from images and reducing the amount of operations in comparing images by employing block processing. The program code causes a computer to execute a method including the aforementioned steps 110~150 shown in FIG. 1. For example, a dividing an image procedure (step 110), a comparing image blocks procedure (step 120), a comparing with the first threshold procedure (step 130), a grouping image blocks procedure (step 140), and a calculating the deviation value of a region and comparing with the second threshold procedure (step 150). Moreover, the comparing step in the step 120 for comparing the incoming image blocks with the corresponding reference image blocks and the calculating step in the step 150 for calculating the deviation value of the region and achieving the grouping processes shown in FIGS. 4B, 4D, 4F, 4H, and 4J (or shown in FIGS. 4A, 4C, 4E, 4G, and 4I) are also included. By doing so, the program code encoded within the computer-readable medium causes the computer to execute a method for detecting motion and filtering noise from images.

Although specific embodiments have been illustrated and described, it will be obvious to those skilled in the art that various modifications may be made without departing from what is intended to be limited solely by the appended claims.

What is claimed is:

1. A method for detecting motion and filtering noise, said method comprising:
   (a) dividing an incoming image into a plurality of blocks;
   (b) comparing said plurality of blocks to corresponding blocks of a referred image and saving compared results into a declared data structure;
   (c) marking a compared result that exceeds a first predetermined threshold, whereby a changed block corresponding to said compared result is indicated;

(d) grouping said compared result into an adjacent region thereof, whereby changed blocks are regionally grouped together; and (e) calculating a deviation value of said region by computing $$\frac{(\sum |x_i - x_{avg}|)}{(n \times x_{avg})}$$

and comparing said deviation value to a second predetermined threshold, whereby motion is detected and the noise caused from moire and interference resulted from an area brightness variation is filtered out, where i=0, to n, n represents a quantity of said compared result in said region, $x_i$ represents said compared result, and $x_{avg}$ represents an average of said compared result in said region.

2. The method according to claim 1, wherein a size of said plurality of blocks is 1%~4% of said incoming image.

3. The method according to claim 1, wherein step (b) comprises the comparing step as follows:

$$(\sqrt{(\Sigma(a_i - b_i)^2)})/(m*m),$$

where i=0 to m*m, m represents a side of said plurality of blocks, and $a_i$ and $b_i$ respectively represent a pixel value of a corresponding block of said incoming image and said referred image.

4. The method according to claim 3, wherein said referred image is a prior image to said incoming image.

5. The method according to claim 3, wherein said referred image is a later image to said incoming image.

6. The method according to claim 1, wherein said first predetermined threshold is 1.

7. The method according to claim 1, wherein step (d) comprises employing a double linked list to group said compared result.

8. The method according to claim 1, wherein said second predetermined threshold is 0.35.

9. A computer-readable medium encoded with computer program code for detecting motion and filtering noise, the program code causing a computer to execute a method comprising:

(a) dividing an incoming image into a plurality of blocks;

(b) comparing said plurality of blocks to corresponding blocks of a referred image and saving compared results into a declared data structure;

(c) marking a compared result that exceeds a first predetermined threshold, whereby a changed block corresponding to said compared result is indicated;

(d) grouping said compared result into an adjacent region thereof, whereby changed blocks are regionally grouped together; and (e) calculating a deviation value of said region by computing $$\frac{(\sum |x_i - x_{avg}|)}{(n \times x_{avg})}$$

and comparing said deviation value to a second predetermined threshold, whereby motion is detected and the noise caused from moire and interference resulted from an area brightness variation is filtered out, where i=0, to n, n represents a quantity of said compared result in said region, $x_i$ represents said compared result, and $x_{avg}$ represents an average of said compared result in said region.

10. The medium according to claim 9, wherein a size of said plurality of blocks is 1%~4% of said incoming image.

11. The medium according to claim 9, wherein step (b) comprises the comparing process as follows:

$$(\sqrt{(\Sigma(a_i - b_i)^2)})/(m*m),$$

where i=0 to m*m, m represents a side of said plurality of blocks, and $a_i$ and $b_i$ respectively represent a pixel value of a corresponding block of said incoming image and said referred image.

12. The method according to claim 11, wherein said referred image is a prior image to said incoming image.

13. The method according to claim 11, wherein said referred image is a later image to said incoming image.

14. The medium according to claim 9, wherein said first predetermined threshold is 1.

15. The medium according to claim 9, wherein step (d) comprises employing a double linked list to group said compared result.

16. The medium according to claim 9, wherein said second predetermined threshold is 0.35.

* * * * *